(12) United States Patent
Park et al.

(10) Patent No.: US 8,822,081 B2
(45) Date of Patent: Sep. 2, 2014

(54) ELECTRODE STRUCTURE AND ELECTROCHEMICAL CELL USING THE SAME

(75) Inventors: Hyun-Ki Park, Yongin-si (KR); Jeong-Doo Yi, Yongin-si (KR); Ju-Yong Kim, Yongin-si (KR); Dong-Hee Han, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 520 days.

(21) Appl. No.: 13/239,220

(22) Filed: Sep. 21, 2011

(65) Prior Publication Data

US 2012/0208072 A1   Aug. 16, 2012

Related U.S. Application Data

(60) Provisional application No. 61/442,654, filed on Feb. 14, 2011.

(51) Int. Cl.
*H01M 4/74* (2006.01)
*H01M 4/80* (2006.01)
*H01M 4/64* (2006.01)

(52) U.S. Cl.
USPC .......................... 429/241; 429/235; 429/233

(58) Field of Classification Search
USPC ................................. 429/241, 235
See application file for complete search history.

(56) References Cited

U.S. PATENT DOCUMENTS

| | | | |
|---|---|---|---|
| 2,662,928 A * | 12/1953 | Brennan | 429/219 |
| 4,615,957 A | 10/1986 | Kagawa | |
| 2010/0058578 A1 | 3/2010 | Vallance et al. | |

FOREIGN PATENT DOCUMENTS

| | | |
|---|---|---|
| JP | 06-150905 | 5/1994 |
| JP | 07-230823 | 8/1995 |

OTHER PUBLICATIONS

Machine English Translation of JP 06-150905 (12 pages).
Machine English Translation of JP 07-230823 (20 pages).

* cited by examiner

*Primary Examiner* — Helen O Conley
(74) *Attorney, Agent, or Firm* — Christie, Parker & Hale, LLP

(57) ABSTRACT

An electrode structure and an electrochemical cell including the electrode structure are provided. The electrode structure includes a porous three-dimensional (3D) outer net including an interconnected plurality of outer metal lines that define a plurality of outer holes between adjacent ones of the outer metal lines. The outer metal lines include a porous 3D inner net, a first layer coating the inner net, and a second layer coating the first layer. The inner net includes an interconnected plurality of inner metal lines that define a plurality of inner holes between adjacent ones of the inner metal lines. The inner metal lines include a first metal. The first layer includes a second metal. The second layer includes a third metal.

20 Claims, 8 Drawing Sheets

ELECTRODE STRUCTURE AND ELECTROCHEMICAL CELL USING THE SAME

CROSS-REFERENCE TO RELATED APPLICATIONS

This application claims priority to and the benefit of U.S. Provisional Application No. 61/442,654, filed on Feb. 14, 2011, in the United States Patent and Trademark Office, the entire content of which is incorporated herein by reference.

BACKGROUND

1. Field

Aspects of embodiments of the present invention relate to an electrode structure and an electrochemical cell using the electrode structure.

2. Description of Related Art

Research into sodium-based electrochemical cells for storing electric power that is generated for household use, electric power that is generated by solar power, and electric power that is generated by wind power and for supplying electric power to electric vehicles is continuing. Electrochemical cells, such as a sodium-chloride nickel cell and a sodium-sulfur (NaS) cell, are large-capacity cells that store a few kilowatts (kW) to a few megawatts (MW) of electric power and have high-energy densities and a long lifetime (life span). Due to the characteristics, they are used in a wide range of applications.

SUMMARY

Aspects of embodiments according to the present invention are directed toward an electrode structure and an electrochemical cell using the electrode structure.

In an exemplary embodiment according to the present invention, an electrode structure is provided. The electrode structure includes a porous three-dimensional (3D) outer net including an interconnected plurality of outer metal lines that define a plurality of outer holes between adjacent ones of the outer metal lines. The outer metal lines include a porous 3D inner net, a first layer coating the inner net, and a second layer coating the first layer. The inner net includes an interconnected plurality of inner metal lines that define a plurality of inner holes between adjacent ones of the inner metal lines. The inner metal lines include a first metal. The first layer includes a second metal. The second layer includes a third metal.

The outer holes may average about 300 μm or smaller in diameter.

The inner holes may average about 400 μm or larger in diameter.

The electrode structure may further include a current collector for moving electrons between the outer net and an external circuit.

The current collector may be sintered to the inner net.

Each of the current collector and the first metal may include copper (Cu).

The first metal may include copper (Cu) or iron (Fe).

The second metal may have a lower standard electric potential than that of the third metal.

The second metal may have a higher ionization tendency than that of the first metal.

The second metal may have a higher ionization tendency than that of the first metal.

The second metal may include zinc (Zn), tin (Sn), titanium (Ti), or chromium (Cr).

The second metal may include Zn.

The third metal may include nickel (Ni).

The third metal may further include iron (Fe).

The third metal may further include about 40% to about 70% Ni by weight of the third metal.

The first metal may include copper (Cu) and the second metal may include zinc (Zn).

In another exemplary embodiment according to the present invention, an electrochemical cell is provided. The electrochemical cell includes a housing, a first chamber in the housing and including an electrode material, a second chamber in the housing and including an electrode structure, and a solid electrolyte separating the first chamber from the second chamber. The electrode structure includes a porous three-dimensional (3D) outer net. The porous 3D outer net includes an interconnected plurality of outer metal lines that define a plurality of outer holes between adjacent ones of the outer metal lines. The outer metal lines include a porous 3D inner net, a first layer coating the inner net, and a second layer coating the first layer. The porous 3D inner net includes an interconnected plurality of inner metal lines that define a plurality of inner holes between adjacent ones of the inner metal lines. The inner metal lines include a first metal. The first layer includes a second metal. The second layer includes a third metal.

The electrochemical cell may further include an electron conductor between the electrode structure and the solid electrolyte.

The second metal may have a lower standard electric potential than that of the third metal and a higher ionization tendency than that of the first metal.

The first metal may include copper (Cu), and the third metal may include nickel (Ni).

The electrode structure may substantially fill the second chamber.

EXPLANATION OF REFERENCE NUMERALS OF SOME OF THE ELEMENTS OF THE DRAWINGS

Figure 1:
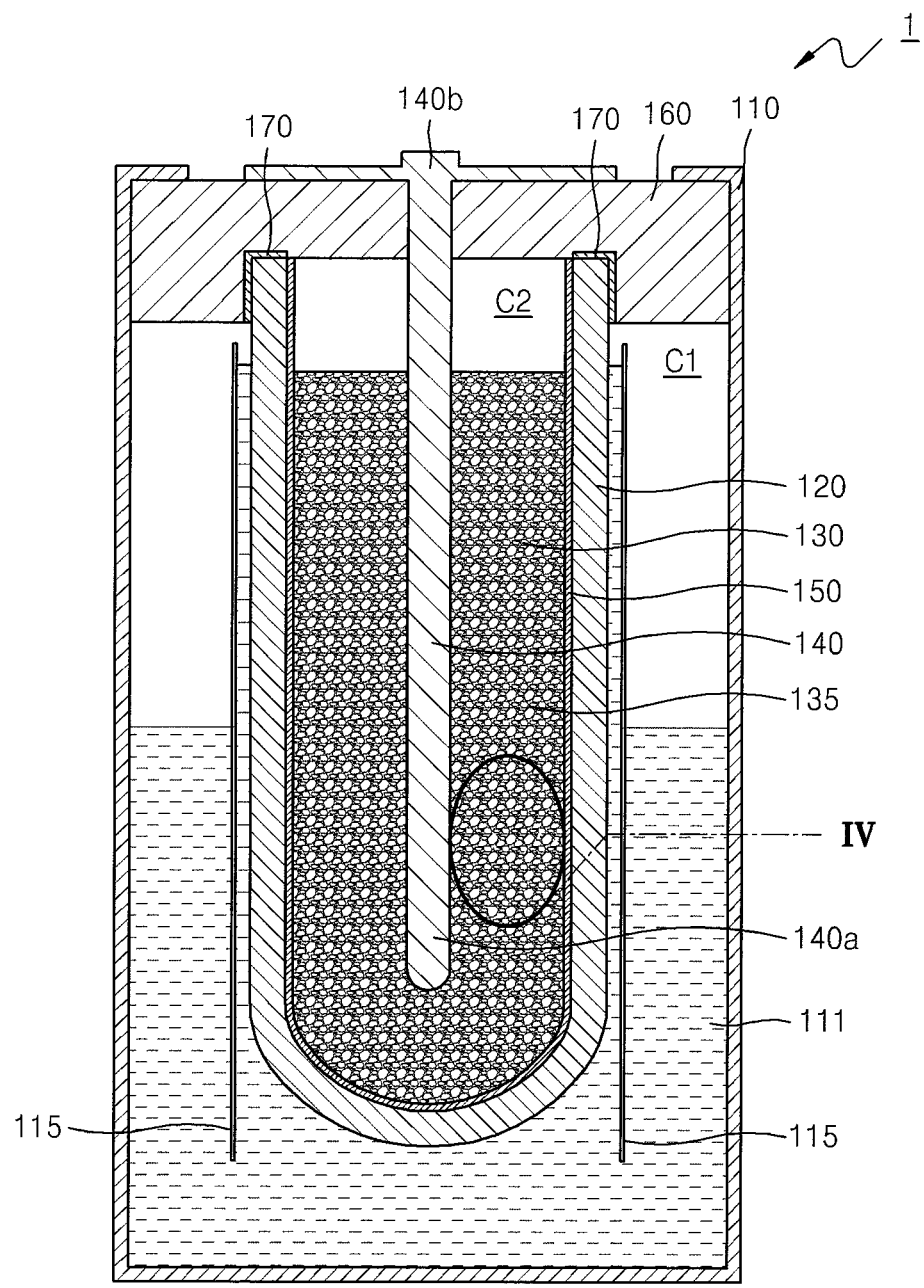
FIG. 1 is a schematic vertical sectional view of an electrochemical cell according to an embodiment of the present invention.

| | |
|---|---|
| 1, 1': electrochemical cell | 110, 810: housing |
| 111, 811 anode material | 115, 815: wick |
| 120, 820: solid electrolyte | |
| 135, 835: liquid electrolyte | 130, 830: cathode structure |
| 140, 140': current collector | 141: lead line |
| 150, 860: electron conductor (carbon felt) | |
| 160, 860: insulator | 170, 870: glass frit |
| 300: metal lines included in a cathode structure (outer net) | |
| 310: first metal (inner net) | |
| 320: second metal layer | 330: third metal layer |
| C1, C1': first chamber (anode chamber) | |
| C2, C2': second chamber (cathode chamber) | |
| S: first metal structure | |

DETAILED DESCRIPTION

Aspects and characteristics of the present invention, and methods for accomplishing them may be apparent to one of ordinary skill in the art in view of embodiments described in detail with reference to the attached drawings. However, the present invention is not limited to the following embodiments, and may have different forms and should not be construed as being limited to the descriptions set forth herein. While this invention has been particularly shown and described with reference to embodiments thereof, it will be understood by those skilled in the art that various changes in form and details may be made therein without departing from the spirit and scope of the invention as defined by the appended claims. The terminology used herein is for the purpose of describing particular embodiments only and is not intended to be limiting of example embodiments.

As used herein, the singular forms "a," "an," and "the" are intended to include the plural forms as well, unless the context clearly indicates otherwise. It will be further understood that the terms "comprises" and/or "comprising," when used in this specification, specify the presence of stated elements, steps, operations, and/or devices, but do not preclude the presence or addition of one or more other elements, steps, operations, and/or devices. It will also be understood that, although the terms first, second, etc. may be used herein to describe various elements, these elements should not be limited by these terms. These terms are only used to distinguish one element from another. Hereinafter, for ease of understanding, like elements are denoted by like reference numerals.

Figure 2:
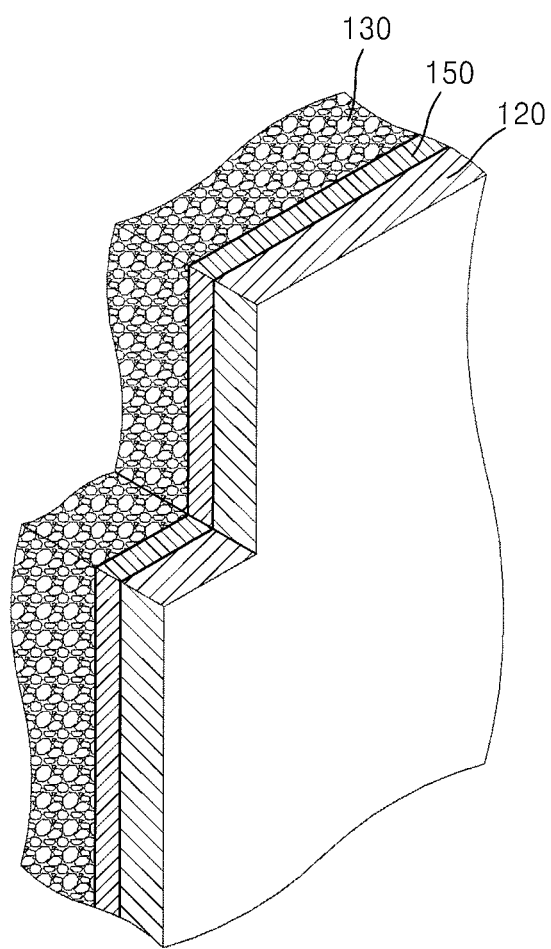
FIG. 2 is a side perspective view of a cathode structure, an electron conductor, and a solid electrolyte of the electrochemical cell of FIG. 1.

FIG. 1 is a schematic vertical sectional view of an electrochemical cell 1 according to an embodiment of the present invention. FIG. 2 is a side perspective view of a cathode structure 130, an electron conductor 150, and a solid electrolyte 120 of the electrochemical cell 1 of FIG. 1.

Referring to FIG. 1, the electrochemical cell 1 includes a housing 110, the solid electrolyte 120 for dividing an inner portion of the housing 110 into a first chamber C1 and a second chamber C2, an anode material (or anode electrode material) 111 included in the first chamber C1, and the porous cathode structure 130 included in the second chamber C2.

The first chamber C1 may be an anode chamber and may include the anode material 111. The anode material 111 may be an alkali metal such as sodium. The sodium may be dissolved and thus present in a liquid phase. Besides sodium, the anode material may also be any other suitable alkali metal such as lithium or potassium.

The first chamber C1 may include a wick 115. The wick 115 is disposed on an outer surface of the solid electrolyte 120 and induces a capillary phenomenon. Therefore, even when the first chamber C1 is not completely filled with sodium, the outer surface of the solid electrolyte 120 may be surrounded by sodium according to the capillary phenomenon.

When the first chamber C1 is the anode chamber, the second chamber C2 is a cathode chamber and may include the cathode structure 130. The cathode structure 130 may include nickel (Ni) that is a cathode material. The cathode structure 130 is a porous metal body and has a three-dimensional (3D) net structure. For example, the cathode structure 130 may include a first metal such as copper (Cu), a second metal layer coated on the first metal, and a third metal layer coated on the second metal layer. The second metal layer and the third metal layer may be uniformly coated on the first metal.

The first metal may use (or be made of) copper (Cu) that is relatively inexpensive and has excellent electron conductivity. In other embodiments, the first metal may use (or be made of) iron (Fe) or iron (Fe) in addition to copper (Cu).

The third metal layer includes a cathode material of the electrochemical cell 1. The third metal layer may include nickel (Ni). For example, the third metal layer may include (or be made of) nickel (Ni) or an alloy of nickel (Ni) and iron (Fe).

The second metal layer includes a metal having a low or lower standard electric potential compared to the third metal layer and having a high or higher ionization tendency compared to the first metal. For example, when the third metal layer includes nickel (Ni), the second metal layer may use (or be made of) a metal, such as zinc (Zn), tin (Sn), titanium (Ti), or chromium (Cr), which has a discharge electric potential lower than that of nickel (Ni) in a liquid electrolyte, or a compound thereof. In addition, ionization tendencies of these metals are higher than that of copper (Cu) as the first metal.

According to an embodiment of the present invention, the first metal may use copper (Cu), the second metal layer may use titanium (Ti), and the third metal layer may use nickel (Ni). In this case, titanium (Ti) may have a thickness of about 2 μm to about 10 μm (or of 2 μm to 10 μm), and nickel (Ni) may have a thickness of about 5 μm to about 50 μm (or of 5 μm to 50 μm). According to another embodiment of the present invention, the first metal may use copper (Cu), the second metal layer may use zinc (Zn), and the third metal layer may use an alloy of iron (Fe) and nickel (Ni). In this case, zinc (Zn) may have a thickness of about 2 μm to about 10 μm (or of 2 μm to 10 μm), and the alloy of iron (Fe) and nickel (Ni) may have a thickness of about 10 μm to about 80 μm (or of 10 μm to 80 μm). Nickel (Ni) that is a cathode material may occupy about 40% to about 70% (or occupy 40% to 70%) by weight of the alloy of iron (Fe) and nickel (Ni). According to another embodiment of the present invention, the first metal may use copper (Cu), the second metal layer may use tungsten (W), and the third metal layer may use nickel (Ni).

The cathode structure 130 will be described in more detail with reference to FIGS. 4 and 5 below.

The second chamber C2 may include a liquid electrolyte 135 such as NaAlCl$_4$, in addition to the cathode structure 130. The cathode structure 130 may be deposited in the liquid electrolyte 135.

A current collector 140 is included in the second chamber C2 and allows electrons generated in charge and discharge operations to easily move. For example, the current collector 140 may allow electrons to easily move between the electrochemical cell 1 and an external circuit. The current collector 140 helps electrons to move from the external circuit to the second chamber C2 during charging of the electrochemical cell 1, and helps electrons to move from the second chamber C2 to the external circuit during discharging of the electrochemical cell 1.

The current collector 140 includes an electric conductive material such as copper (Cu). For example, one end 140a of the current collector 140 may be disposed penetrating the center of the cathode structure 130, and another end 140b thereof may be exposed outside the electrochemical cell 1.

The electron conductor 150 may be included in the solid electrolyte 120. For example, the electron conductor 150 may be disposed between the cathode structure 130 and the inner surface of the solid electrolyte 120. The electron conductor 150 allows electrons to easily move in the second chamber C2. The electron conductor 150 may include a carbon-based material. For example, the electron conductor 150 may be formed of carbon felt.

The solid electrolyte 120 may allow ions to flow therethrough. Alkali ions that are generated during charging and discharging (for example, sodium ions) may flow from the first chamber C1 to the second chamber C2 through the solid electrolyte 120, or from the second chamber C2 to the first chamber C1 through the solid electrolyte 120. The solid electrolyte 120 may have a tube-shape having an open side (or end) and a closed side (or end), and may be disposed inside the housing 110.

The solid electrolyte 120 may include a β-alumina based material. For example, the solid electrolyte 120 may include β-alumina or β"-alumina.

The insulator 160 may electrically insulate the first chamber C1 from the second chamber C2. The insulator 160 may be joined to a side of the solid electrolyte 120 via an adhesive material, for example, a glass frit 170. The insulator 160 may include α-alumina.

In the present embodiment, the first chamber C1 that is the anode chamber is included in the electrochemical cell 1, and the second chamber C2 that is the cathode chamber is disposed inside the first chamber C1. However, the present invention is not limited thereto. For example, the first chamber C1 may be disposed inside the second chamber C2, and the second chamber C2 may be included in the electrochemical cell 1.

Figure 3:
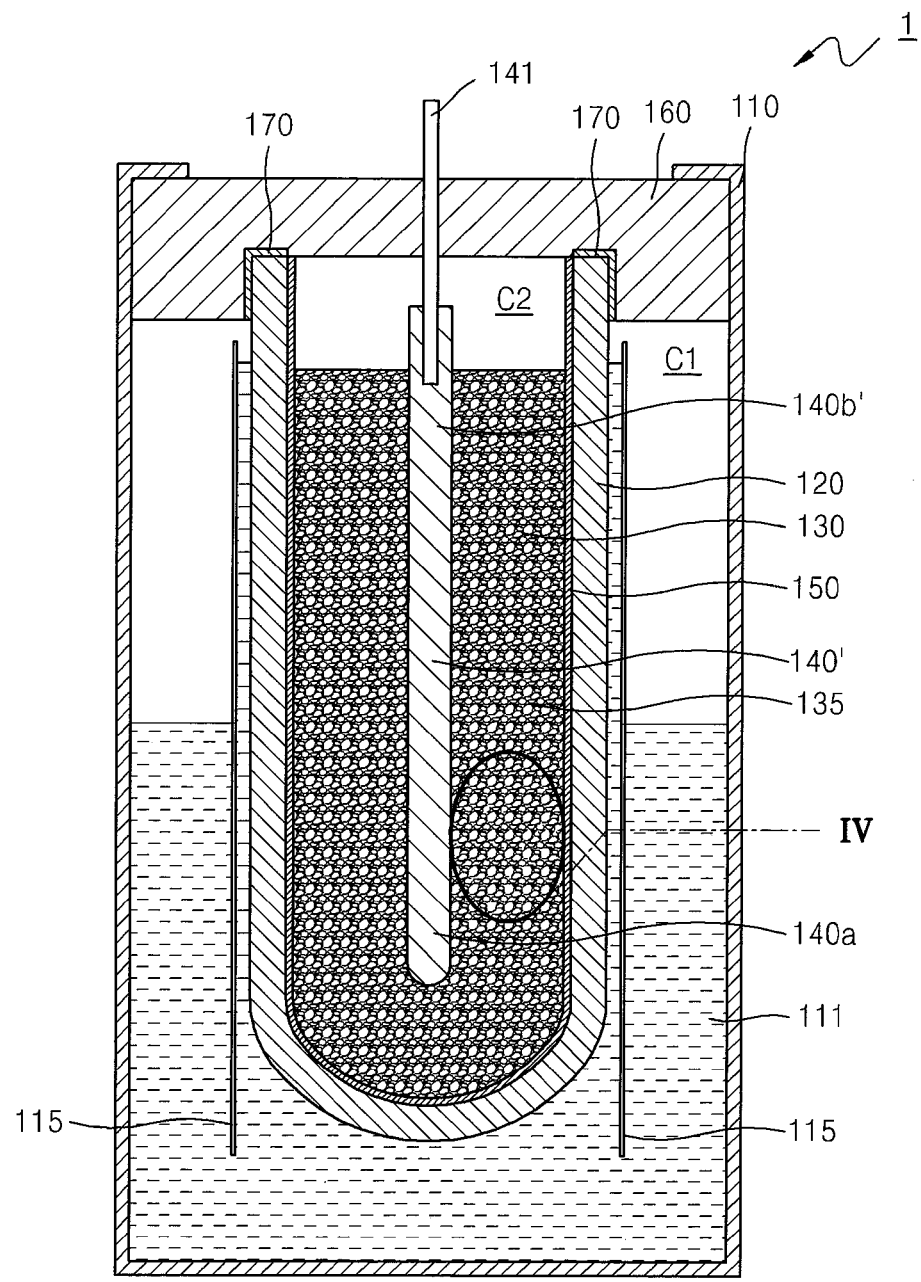
FIG. 3 is a schematic vertical sectional view of an electrochemical cell according to another embodiment of the present invention.

FIG. 3 is a schematic vertical sectional view of the electrochemical cell 1 according to another embodiment of the present invention.

Referring to FIG. 3, the electrochemical cell 1 includes the housing 110, the solid electrolyte 120 for dividing an inner portion of the housing 110 into the first chamber C1 and the second chamber C2, the anode material 111 included in the first chamber C1, and the porous cathode structure 130 included in the second chamber C2.

The cathode structure 130 is a porous metal body and has a 3D net structure. The cathode structure 130 may include a first metal such as copper, a second metal layer coated on the first metal, and a third metal layer coated on the second metal layer. The second metal layer and the third metal layer may be uniformly coated on the first metal.

The first metal may use (or be made of) copper (Cu) that is relatively inexpensive and has excellent electron conductivity. The third metal layer includes a cathode material of the electrochemical cell 1. For example, the third metal layer may include (or be made of) nickel (Ni). Alternatively, the third metal layer may include an alloy of nickel (Ni) of about 40% to about 70% (or of 40% to 70%) iron (Fe) by weight of the third metal layer.

The second metal layer includes a metal having a low standard electric potential compared to the third metal layer. For example, when the third metal layer includes nickel (Ni), the second metal layer may use a metal, such as zinc (Zn), titanium (Ti), or chromium (Cr), or a compound thereof. The ionization tendency of the second metal layer is higher than that of the first metal. If the first metal is exposed to a liquid electrolyte, performance of the electrochemical cell 1 deteriorates. To prevent or reduce such deterioration of performance of the electrochemical cell 1, the ionization tendency of the second metal layer is higher than that of the first metal. The electrochemical cell 1 of the present embodiment is different from the electrochemical cell 1 described with reference to FIGS. 1 and 2 in terms of a structure of the current collector 140' coupled to the cathode structure 130. The differences therebetween will now be described.

The current collector 140' may have a pole shape. One end 140a of the current collector 140' may penetrate the center of the cathode structure 130, and another end 140b' thereof may not be exposed outside the electrochemical cell 1. The other end 140b' of the current collector 140' is shorter than the other end 140b shown in FIG. 1, and thus the current collector 140' may include a lead line 141 for an electrical connection to an external circuit.

For example, the lead line 141 includes an electric conductive material. The lead line 141 may be coupled to a groove formed in the other end 140b' of the current collector 140'. Alternatively, the lead line 141 may be coupled to the groove by using various methods like welding, adhering, etc.

Figure 4:
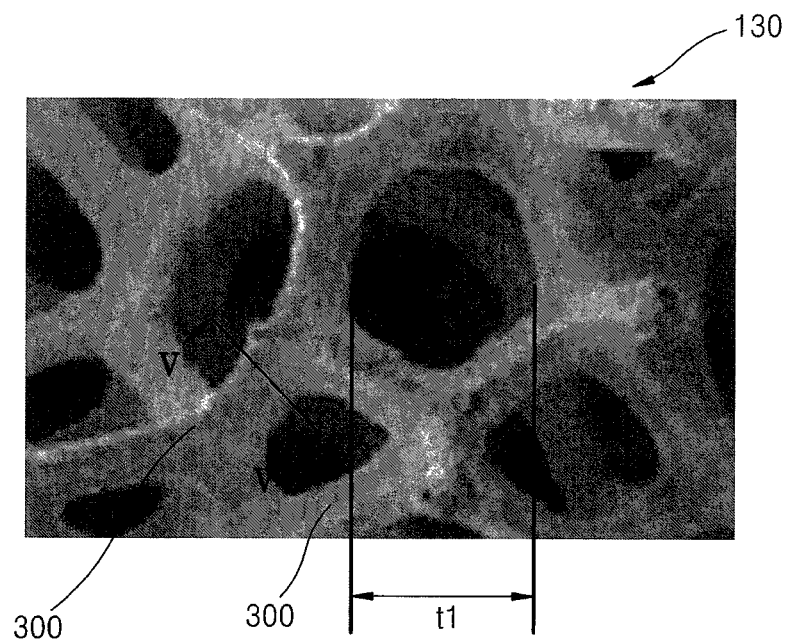
FIG. 4 is an enlarged scanning electron microscope (SEM) photo of the IV region of FIG. 1.
Figure 5A:
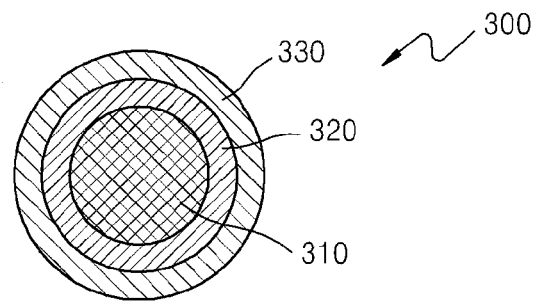
FIGS. 5A and 5B are cross-sectional views taken along the line V-V of FIG. 4.
Figure 5B:
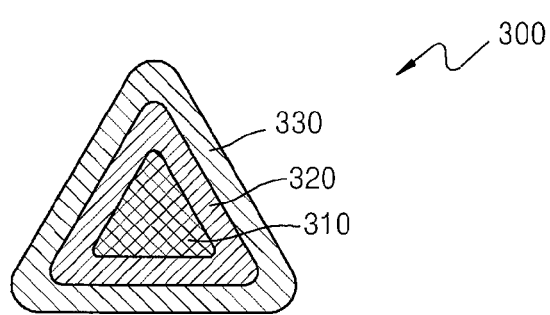

FIG. 4 is an enlarged scanning electron microscope (SEM) photo of the IV region of FIG. 1. FIG. 5A is a cross-sectional view of metal lines 300 included in the cathode structure 130 taken along the line V-V of FIG. 4 according to an embodiment of the present invention. FIG. 5B is a cross-sectional view of the metal lines 300 included in the cathode structure 130 taken along the line V-V of FIG. 4 according to another embodiment of the present invention.

Referring to FIG. 4, the cathode structure 130 has a 3D net structure. For example, the metal lines 300 are 3-dimensionally connected to one another (i.e., interconnected outer metal lines) to form the 3D net structure (that is, an outer net). Meanwhile, a diameter t1 of a hole (that is, an outer hole) formed in the porous cathode structure 130 may be smaller than about 300 μm (or about 300 μm or smaller). In the present embodiment, a first metal may use copper (Cu), a second metal layer may use zinc (Zn), and a third metal layer may use nickel (Ni).

Referring to FIG. 5A, each of the metal lines 300 included in the cathode structure 130 may be formed by sequentially coating a second metal layer 320 and a third metal layer 330 on a first metal 310. That is, the second metal layer 320 and the third metal layer 330 may be disposed to surround the first metal 310 that is interposed between the second metal layer 320 and the third metal layer 330. The second metal layer 320 and the third metal layer 330 may be uniformly coated on the first metal 310.

Referring to FIGS. 5A and 5B, the metal lines 300 may have circular or triangular cross-sections. However, such shapes are exemplary, and the present invention is not limited to the cross-sectional shapes of the metal lines 300.

Figure 6:
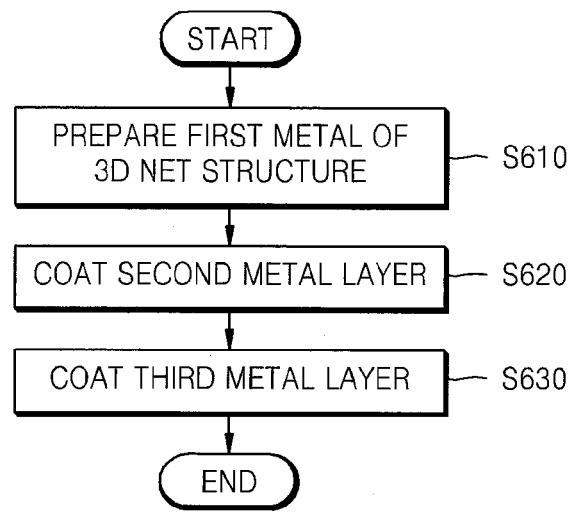
FIG. 6 is a flowchart illustrating a method of manufacturing a cathode structure according to an embodiment of the present invention.
Figure 7A:
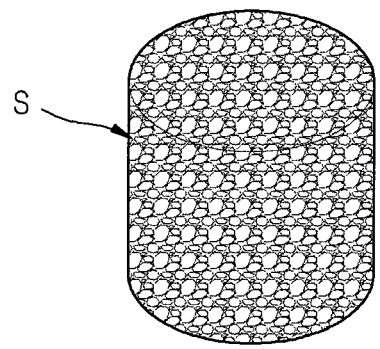
FIG. 7A is a perspective view of a first metal structure having a three-dimensional (3D) net structure of operation S610 of FIG. 6 according to an embodiment of the present invention.
Figure 7B:
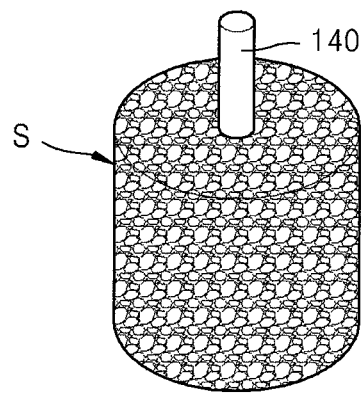
FIG. 7B is a perspective view of a first metal structure having a 3D net structure of operation S610 of FIG. 6 according to another embodiment of the present invention.

FIG. 6 is a flowchart illustrating a method of manufacturing the cathode structure 130 according to an embodiment of the present invention. FIGS. 7A and 7B are schematic perspective views of a first metal structure S having a 3D net structure.

Referring to FIG. 6, in operation S610, the first metal structure S having the 3D net structure is prepared. For descriptive convenience, the first metal structure S having the 3D net structure is referred to as the first metal structure S. The first metal structure S may use copper (Cu) that is relatively inexpensive and has excellent electron conductivity. Referring to FIG. 7A, the first metal structure S may have an approximately cylindrical shape.

Referring to FIG. 7B, the first metal structure S may be coupled to the current collector 140 in operation S610. For example, the first metal structure S and the current collector 140 may be coupled by thermally treating and sintering the first metal structure S and the current collector 140 in an $N_2$ atmosphere at a high temperature of about 800° C. to about 1000° C.

The current collector 140 may be disposed in the center of the first metal structure S. In subsequent operations S620 and S630 of coating the second metal layer 320 and the third metal layer 330, the current collector 140 acts as a handle. The current collector 140 may use copper (Cu) that is same as the first metal.

The first metal structure S of FIG. 7A does not include the current collector 140. The first metal structure S of FIG. 7A may be coupled to the current collector 140 after the cathode structure 130 is completely manufactured according to the present embodiment.

Figure 7C:
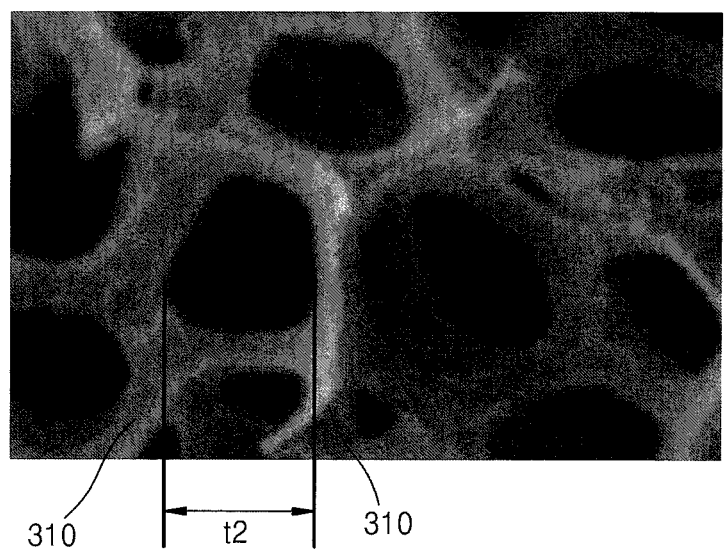
FIG. 7C is an enlarged SEM photo of a part of a first metal of FIGS. 7A and 7B.

FIG. 7C is a partially enlarged SEM photo of the first metal structure S of FIGS. 7A and 7B.

Referring to FIG. 7C, the first metal structure S has a 3D net structure. For example, metal lines 310 are 3-dimensionally connected to one another (i.e., interconnected inner metal lines) to form the 3D net structure (that is, an inner net). Meanwhile, a diameter t2 of a hole (that is, an inner hole) formed in the first metal structure S may be at least about 400 μm (or about 400 μm or larger).

Although the first metal structure S has a cylindrical shape in the present embodiment, the present invention is not limited thereto. According to other embodiments, the cathode structure 130 that is manufactured according to the present invention may have other shapes that wholly fill (or substantially fill) the second chamber C2, or whose volumes or cross-sectional areas are substantially the same as those of the second chamber C2. For example, if the solid electrolyte 120 of the electrochemical cell 1 of FIGS. 1 and 3 has an approximately hexagonal shape, a first metal 310 may have a hexagonal (cross-sectional) shape. Meanwhile, if positions of the cathode chamber C2 and the anode chamber C1 exchange in the electrochemical cell 1 of FIGS. 1 and 3, the first metal 310 may have a hollow tubular shape.

In operation S620, the second metal layer 320 is coated on the metal lines 310 included in the first metal 310. The second metal layer 320 may use a metal, such as zinc (Zn), tin (Sn), titanium (Ti), or chromium (Cr), or a compound thereof. The second metal layer 320 may be coated on the metal lines 310 in a thickness of several μm to several tens of μm by using electric plating, electroless plating, physical deposition, chemical deposition, etc.

In operation S630, the third metal layer 330 is coated on the second metal layer 320. The third metal layer 330 may include nickel (Ni) as a cathode material. For example, the third metal layer 330 may include nickel (Ni) or an alloy of nickel (Ni). The alloy of nickel (Ni) may be an alloy of nickel (Ni) and iron (Fe). The third metal layer 330 may be coated on the second metal layer 320 in a thickness of several μm to several hundred μm by using electric plating, electroless plating, physical deposition, chemical deposition, etc.

FIG. 7C illustrates the first metal structure S before a coating process of operations S620 and S630 is performed. FIG. 4 illustrates the cathode structure 130 completely manufactured according to the coating process.

Referring to FIGS. 7C and 4, distances t2 between the metal lines 310 included in the first metal structure S including copper (Cu) were each initially about 400 μm. Thereafter, if the cathode structure 130 is manufactured by coating the second and third metal layers 320 and 330 on the metal lines 310, distances t1 between the metal lines 300 included in the cathode structure 130 are each about 300 μm. The distances t1 between the metal lines 300 included in the cathode structure 130 may vary according to thicknesses of the second and third metal layers 320 and 330.

A method of coating the cathode structure 130 of the present invention by coating zinc (Zn) that is the second coating layer 320 and nickel (Ni) that is the third coating layer 330 by using electroless plating will now be described below. The embodiment below is exemplary and the scope of the present invention is not limited. A method of coating zinc (Zn) that is the second coating layer 320 is first described.

The first metal structure S as shown in FIG. 7A or 7B is cleansed. The first metal structure S may be cleansed by soaking the first metal structure S in a weak alkali solution of about 2% of KOH and applying an ultrasonic wave thereto for about 5 minutes. Thereafter, the first metal structure S may be cleansed in distilled water three times for about 3 minutes each time.

Thereafter, a solution containing a zinc precursor is manufactured. For example, about 20 g of NaOH and 100 ml of $H_2O$ are sufficiently mixed and are heated up to a temperature of 100° C. If about 5 g of Zn powder is added to the boiling solution, the solution containing the zinc precursor may be manufactured by a reaction of NaOH and Zn.

The first metal structure S is added to the solution and the ultrasonic wave is applied thereto. Then, zinc (Zn) is coated on the metal lines 310 included in the first metal structure S. If the ultrasonic wave is applied to the solution containing the first metal structure S, zinc (Zn) may have a thickness of about 0.5 μm to about 1.5 μm.

The first metal structure S coated with zinc (Zn) is taken from the solution and is cleansed. If the first metal structure S is coupled to the current collector 140 as shown in FIG. 7A, the first metal structure S coated with zinc (Zn) may be easily taken from the solution. After cleansing the first metal structure S, if the first metal structure S is thermally treated at a temperature of about 150° C. for about 20 minutes, zinc (Zn) may be tightly coupled to the metal lines 310 of the first metal structure S.

Next, a method of coating nickel (Ni) that is the third coating layer 330 is described. First, the structure in which zinc (Zn) is coated on copper (Cu) is cleansed. For example, the structure may be cleansed by soaking the structure in a weak alkali solution of about 2% of KOH and applying an ultrasonic wave thereto for about 5 minutes. Further, the structure may be cleansed after processing the structure with a palladium (Pd) catalyst and soaking the structure in a sulfuric acid solution of 6.5 wt % for about 1 minute.

An electroless nickel-plating solution is manufactured. The electroless nickel-plating solution may include a nickel precursor, a deoxidizing agent, a pH-adjusting agent, and a complexing agent. Further, the electroless nickel-plating solution may include a small amount of an accelerator, a stabilizer, a surfactant, etc.

The nickel precursor may use soluble nickel sulfate, nickel chloride, etc. The deoxidizing agent may use sodium hypophosphite, sodium borohydride, hydrazine, etc. Meanwhile, the pH-adjusting agent may use sodium hydroxide, ammonium hydroxide, etc. The complexing agent may allow a stable supply of nickel. The complexing agent may use two or more materials selected from the group consisting of lactic acid, glycolic acid, and malic acid. The accelerator may use citric acid soda, acetic acid soda, etc. The whole weight of the electroless nickel-plating solution may include nickel sulfate ($NiSO_4 \cdot 6H_2O$) of about 5 wt %, sodium hypophosphite ($NaH_2PO_2 \cdot 6H_2O$) that is the deoxidizing agent of about 3.5 wt %, and the complexing agent of about 5.0 wt %.

The electroless nickel-plating solution is heated at a temperature of about 80° C., and then the structure in which zinc (Zn) is coated on copper (Cu) is put into the electroless nickel-plating solution. The electroless nickel-plating solution is mixed in a direction so that nickel is uniformly coated. In this regard, pH is about 4.5. If such mixing is performed for about 15 minutes, a thickness of coated nickel may be about 10 μm to about 12 μm. The completely coated nickel is cleansed by $H_2O$ and is dried at a temperature of about 80° C. about 45 minutes.

Figure 8:
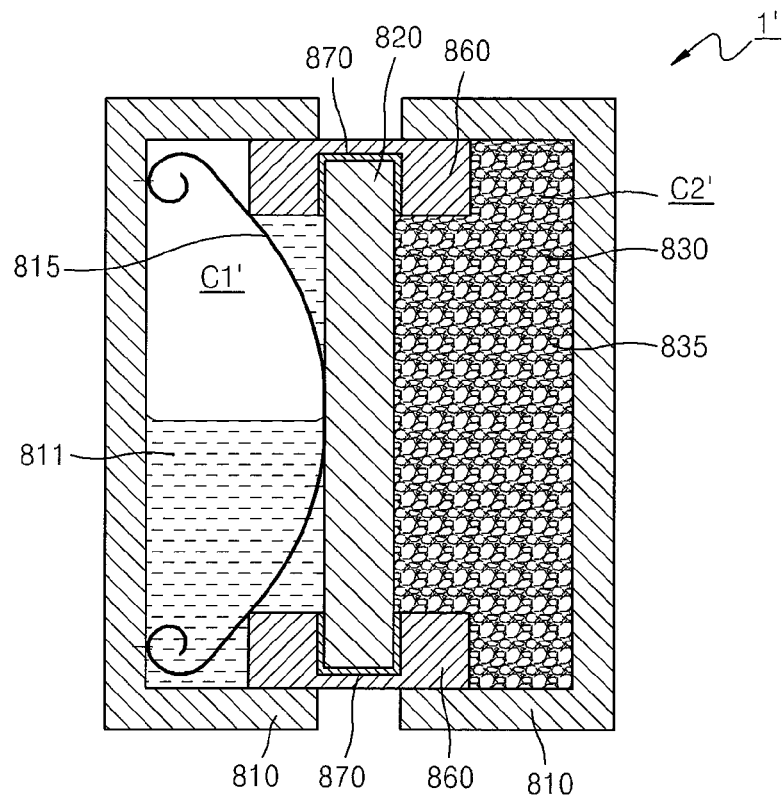
FIG. 8 is a schematic cross-sectional view of an electrochemical cell according to another embodiment of the present invention.

FIG. 8 is a schematic cross-sectional view of the electrochemical cell 1' according to another embodiment of the present invention. The electrochemical cell 1' of the present embodiment has a flat panel shape that is different from the tubular electrochemical cell 1 described with reference to FIGS. 1 through 4.

Referring to FIG. 8, the electrochemical cell 1' includes a housing 810, a solid electrolyte 820 for dividing an inner portion of the housing 810 into the first chamber C1' and the second chamber C2', an anode material 811 included in the first chamber C1', and the porous cathode structure 830 included in the second chamber C2'.

The solid electrolyte 820 may allow ions to flow therethrough. The solid electrolyte 820 may include a β-alumina based material. For example, the solid electrolyte 820 may include β-alumina or β"-alumina.

The insulator 860 may electrically insulate the first chamber C1' from the second chamber C2'. The insulator 860 may be joined to a side of the solid electrolyte 820 via an adhesive material, for example, a glass frit 870. The insulator 860 may include α-alumina.

The first chamber C1' may be an anode chamber and may include an anode material 811. The anode material may be an alkali metal such as sodium. The sodium may be present in a liquid phase. Besides sodium, the anode material may also be any other suitable alkali metal such as lithium or potassium.

The first chamber C1' may include a wick 815. The wick 815 is spaced apart from the solid electrolyte 820 by a set or predetermined space and induces a capillary phenomenon, as described above.

When the first chamber C1' is the anode chamber, the second chamber C2' is a cathode chamber and may include a cathode structure 830. The cathode structure 830 may include a first metal such as copper, a second metal layer coated on the first metal, and a third metal layer coated on the second metal layer. In this regard, the first metal may use copper (Cu) that is relatively inexpensive and has excellent electron conductivity. The third metal layer includes a cathode material such as nickel.

The second metal layer includes a metal having a low standard electric potential compared to the third metal layer, and the ionization tendency of the second metal layer is higher than that of the first metal. For example, when the third metal layer includes nickel (Ni), the second metal layer may use a metal, such as zinc (Zn), titanium (Ti), or chromium (Cr), or a compound thereof. The specific shape and construction of the cathode structure 830, and a method of manufacturing the cathode structure 830 are the same as described above.

The cathode structure 830 has an approximately hexahedral shape and is contained in the flat panel type electrochemical cell 1'. However, the present invention is not limited to this shape of the cathode structure 830. In other embodiments, the cathode structure 830 may have different shapes and may wholly fill (or substantially fill) the second chamber C2', or may have volumes or cross-sectional areas that are substantially the same as those of the second chamber C2'.

The second chamber C2' may include a liquid electrolyte 835 such as $NaAlCl_4$, in addition to the cathode structure 830. The cathode structure 830 may be deposited in the liquid electrolyte 835.

Figure 9:
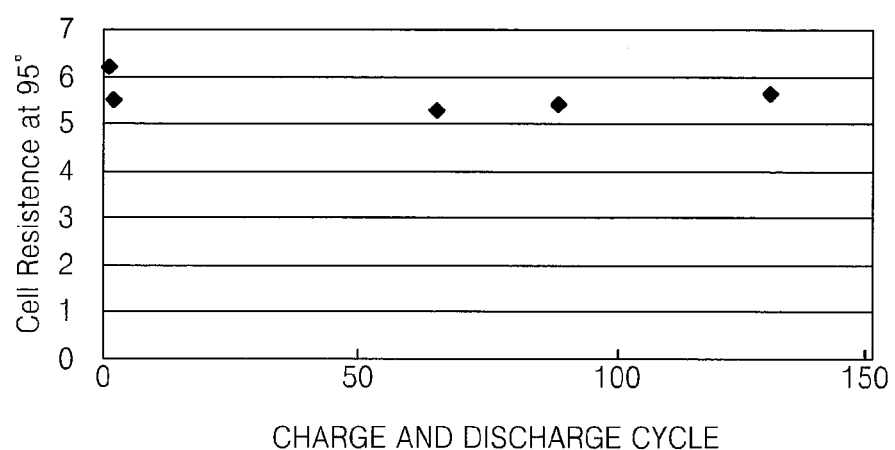
FIG. 9 is a graph of a relationship between a charge and discharge cycle and a resistance of an electrochemical cell in a simulation result of the electrochemical cell according to an embodiment of the present invention.

FIG. 9 is a simulation graph of a resistance of the electrochemical cell 1 having a capacity of about 40 Ah and a cathode structure at a temperature of about 95° C. according to an embodiment of the present invention.

Referring to FIG. 9, the graph shows that the electrochemical cell 1 maintains a constant resistance value in spite of a repetition of charging and discharging. Generally, an anode and an electrolyte of a sodium-based electrochemical cell have relatively constant resistance values. However, a resistance value of a cathode of the sodium-based electrochemical cell is a very critical factor to performance thereof. The electrochemical cell 1 including the cathode structure according to the present embodiment may prevent or protect an electrode from degenerating or deforming in charging and discharging operations, and may maintain a constant resistance. A resistance value of a cathode of the electrochemical cell 1 including the cathode structure is maintained constant (or substantially constant), thereby obtaining high output characteristics and increasing cell lifetime.

Furthermore, the electrochemical cell 1 according to the present embodiment may be realized by using a minimum amount of a cathode material such as nickel, thereby reducing manufacturing cost and maximizing cell efficiency.

It should be understood that the exemplary embodiments described therein should be considered in a descriptive sense only and not for purposes of limitation. Descriptions of features or aspects within each embodiment should typically be considered as available for other similar features or aspects in other embodiments. Accordingly, it will be understood by those of ordinary skill in the art that various changes in form and details may be made without departing from the spirit and scope of the present invention as set forth in the following claims, and equivalents thereof.

What is claimed is:

1. An electrode structure comprising:
   a porous three-dimensional (3D) outer net comprising an interconnected plurality of outer metal lines that define a plurality of outer holes between adjacent ones of the outer metal lines, the outer metal lines comprising:
      a porous 3D inner net comprising an interconnected plurality of inner metal lines that define a plurality of inner holes between adjacent ones of the inner metal lines, the inner metal lines comprising a first metal;
      a first layer coating the inner net and comprising a second metal; and
      a second layer coating the first layer and comprising a third metal.

2. The electrode structure of claim 1, wherein the outer holes average about 300 μm or smaller in diameter.

3. The electrode structure of claim 1, wherein the inner holes average about 400 μm or larger in diameter.

4. The electrode structure of claim 1, further comprising a current collector for moving electrons between the outer net and an external circuit.

5. The electrode structure of claim 4, wherein the current collector is sintered to the inner net.

6. The electrode structure of claim 5, wherein each of the current collector and the first metal comprises copper (Cu).

7. The electrode structure of claim 1, wherein the first metal comprises copper (Cu) or iron (Fe).

8. The electrode structure of claim 1, wherein the second metal has a lower standard electric potential than that of the third metal.

9. The electrode structure of claim 8, wherein the second metal has a higher ionization tendency than that of the first metal.

10. The electrode structure of claim 1, wherein the second metal has a higher ionization tendency than that of the first metal.

11. The electrode structure of claim 1, wherein the second metal comprises zinc (Zn), tin (Sn), titanium (Ti), or chromium (Cr).

12. The electrode structure of claim 11, wherein the second metal comprises Zn.

13. The electrode structure of claim 1, wherein the third metal comprises nickel (Ni).

14. The electrode structure of claim 13, wherein the third metal further comprises iron (Fe).

15. The electrode structure of claim 14, wherein the third metal comprises about 40% to about 70% Ni by weight of the third metal.

16. The electrode structure of claim 13, wherein the first metal comprises copper (Cu) and the second metal comprises zinc (Zn).

17. An electrochemical cell comprising:
   a housing;
   a first chamber in the housing and comprising an electrode material;
   a second chamber in the housing and comprising an electrode structure, the electrode structure comprising a porous three-dimensional (3D) outer net, the porous 3D outer net comprising an interconnected plurality of outer metal lines that define a plurality of outer holes between adjacent ones of the outer metal lines, the outer metal lines comprising:
      a porous 3D inner net comprising an interconnected plurality of inner metal lines that define a plurality of inner holes between adjacent ones of the inner metal lines, the inner metal lines comprising a first metal;
      a first layer coating the inner net and comprising a second metal; and
      a second layer coating the first layer and comprising a third metal; and
   a solid electrolyte separating the first chamber from the second chamber.

18. The electrochemical cell of claim 17, further comprising an electron conductor between the electrode structure and the solid electrolyte.

19. The electrochemical cell of claim 17, wherein the second metal has a lower standard electric potential than that of the third metal and a higher ionization tendency than that of the first metal.

20. The electrochemical cell of claim 17, wherein the first metal comprises copper (Cu), and the third metal comprises nickel (Ni).

* * * * *